(12) United States Patent
Grapov et al.

(10) Patent No.: US 10,201,878 B2
(45) Date of Patent: Feb. 12, 2019

(54) LASER CUTTING HEAD WITH CONTROLLABLE COLLIMATOR HAVING MOVABLE LENSES FOR CONTROLLING BEAM DIAMETER AND/OR FOCAL POINT LOCATION

(71) Applicant: IPG Photonics Corporation, Oxford, MA (US)

(72) Inventors: Yuri Grapov, Sutton, MA (US); Felix Stukalin, Southborough, MA (US); Nikhit Nair, Northborough, MA (US)

(73) Assignee: IPG Photonics Corporation, Oxford, MA (US)

( * ) Notice: Subject to any disclaimer, the term of this patent is extended or adjusted under 35 U.S.C. 154(b) by 429 days.

(21) Appl. No.: 15/186,971

(22) Filed: Jun. 20, 2016

(65) Prior Publication Data

US 2016/0368099 A1 Dec. 22, 2016

Related U.S. Application Data

(60) Provisional application No. 62/182,217, filed on Jun. 19, 2015.

(51) Int. Cl.
| | |
|---|---|
| *B23K 26/38* | (2014.01) |
| *B23K 26/06* | (2014.01) |
| *B23K 26/08* | (2014.01) |
| *B23K 26/14* | (2014.01) |
| *B23K 26/142* | (2014.01) |

(52) U.S. Cl.
CPC .......... *B23K 26/38* (2013.01); *B23K 26/0648* (2013.01); *B23K 26/0853* (2013.01); *B23K 26/142* (2015.10); *B23K 26/1476* (2013.01)

(58) Field of Classification Search
CPC ................................ B23K 26/38; B23K 26/06
USPC .......................... 219/121.67–121.72, 121.75
See application file for complete search history.

(56) References Cited

U.S. PATENT DOCUMENTS

| | | | |
|---|---|---|---|
| 4,467,171 A | 8/1984 | Ramos | |
| 5,828,501 A | 10/1998 | Menard et al. | |
| 6,559,409 B1 * | 5/2003 | Cadet .................... | H01L 23/544 219/121.68 |
| 7,286,218 B2 | 10/2007 | Tiemeyer et al. | |
| 2004/0001419 A1 * | 1/2004 | Ariyoshi .............. | G11B 7/1275 369/112.04 |

(Continued)

FOREIGN PATENT DOCUMENTS

CN 201201128 Y 3/2009

OTHER PUBLICATIONS

PCT International Search Report and Written Opinion dated Nov. 4, 2016, received in PCT Application No. PCT/US16/38341, 12 pgs.

*Primary Examiner* — Samuel M Heinrich
(74) *Attorney, Agent, or Firm* — Grossman, Tucker, Perreault & Pfleger, PLLC

(57) ABSTRACT

A laser cutting head includes a controllable collimator with movable collimator lenses for controlling beam diameter and/or focal point location. The laser cutting head may be used in a laser cutting system with a control system for controlling the position of the movable collimator lenses. The lenses may be moved, for example, to adjust the beam spot size for cutting different types of material or material thicknesses. The lenses may also be moved to adjust a focal point back to the workpiece after changing the distance of the laser cutting head relative to the workpiece.

24 Claims, 5 Drawing Sheets

(56) References Cited

U.S. PATENT DOCUMENTS

| | | |
|---|---|---|
| 2007/0164239 A1 | 7/2007 | Terwilliger et al. |
| 2010/0072180 A1 | 3/2010 | Schuermann et al. |
| 2010/0116796 A1* | 5/2010 | Jancso ............... B23K 26/0884 219/121.67 |
| 2011/0127697 A1* | 6/2011 | Milne ................. B23K 26/046 264/400 |

* cited by examiner

LASER CUTTING HEAD WITH CONTROLLABLE COLLIMATOR HAVING MOVABLE LENSES FOR CONTROLLING BEAM DIAMETER AND/OR FOCAL POINT LOCATION

CROSS-REFERENCE TO RELATED APPLICATIONS

The present application claims the benefit of U.S. Provisional Patent Application Ser. No. 62/182,217 filed on Jun. 19, 2015, which is fully incorporated herein by reference.

TECHNICAL FIELD

The present invention relates to laser cutting and more particularly, to a laser cutting head including a controllable collimator with movable lenses for controlling beam diameter and/or focal point location.

BACKGROUND INFORMATION

Lasers such as fiber lasers are often used for materials processing applications such as cutting. A conventional laser cutting head includes a collimator for collimating laser light and a focus lens for focusing the laser light to a workpiece to be cut. Some cutting applications require different beam spot sizes and/or different focal points relative to the workpiece. Existing cutting heads do not allow the beam spot size and focal point to be quickly adjusted for these cutting applications.

SUMMARY

Consistent with an embodiment, a laser cutting head includes a controllable collimator configured to be coupled to an output fiber of a fiber laser and a focus lens configured to focus the laser beam relative to a workpiece. The controllable collimator includes at least first and second movable collimator lenses and a lens moving mechanism coupled to the lenses such that each of the lenses is movable independently.

Consistent with another embodiment, a controllable collimator module includes an input end configured to be coupled to a fiber coupled to a fiber laser, an output end configured to be coupled to a focus lens assembly, at least first and second movable collimator lenses, and a pneumatic lens moving mechanism coupled to the lenses such that each of the lenses is movable independently.

Consistent with a further embodiment, a laser cutting system includes a fiber laser including an output fiber and a laser cutting head coupled to the output fiber of the fiber laser. The laser cutting head includes a controllable collimator a focus lens configured to focus the laser beam relative to a workpiece. The controllable collimator includes at least first and second movable collimator lenses and a lens moving mechanism coupled to the lenses such that each of the lenses is movable independently. The laser cutting system also includes a control system for controlling at least the fiber laser and positions of the collimator lenses.

Consistent with yet another embodiment, a laser cutting method includes: providing a laser cutting head including at least first and second movable collimator lenses, a lens moving mechanism for moving the collimating lenses, and a focus lens; generating a raw laser beam from a fiber laser; collimating the raw laser beam by passing the beam through the first and second movable collimating lenses; focusing the beam by passing the beam through the focus lens toward the workpiece; and moving the collimating lenses with the lens moving mechanism to change at least one of a beam spot size and a focal point location.

BRIEF DESCRIPTION OF THE DRAWINGS

These and other features and advantages will be better understood by reading the following detailed description, taken together with the drawings wherein.

DETAILED DESCRIPTION

A laser cutting head, consistent with embodiments of the present disclosure, includes a controllable collimator with movable collimator lenses for controlling beam diameter and/or focal point location. The laser cutting head may be used in a laser cutting system with a control system for controlling the position of the movable collimator lenses. The lenses may be moved, for example, to adjust the beam spot size for cutting different types of material or material thicknesses. The lenses may also be moved to adjust a focal point back to the workpiece after changing the distance of the laser cutting head relative to the workpiece.

Figure 1:
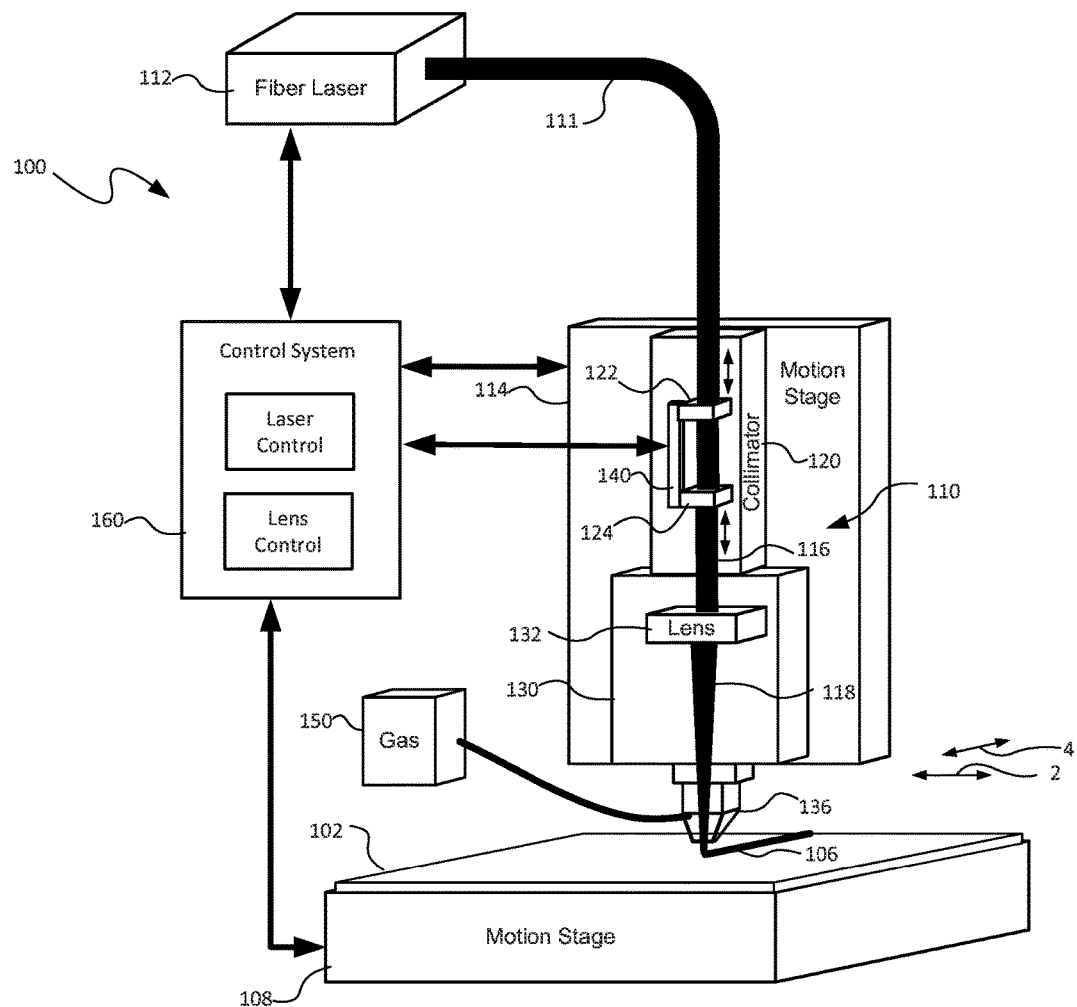
FIG. 1 is a schematic block diagram of a system including a laser cutting head with a collimator having movable lenses, consistent with an embodiment of the present disclosure.
Figure 2:
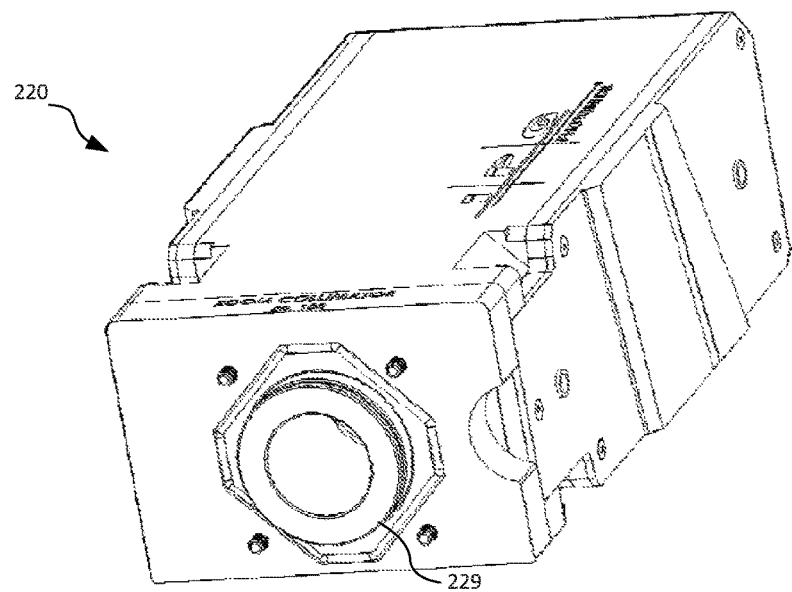
FIGS. 2 and 3 are perspective views of an embodiment of a controllable collimator module used in a laser cutting head, consistent with the present disclosure
Figure 3:
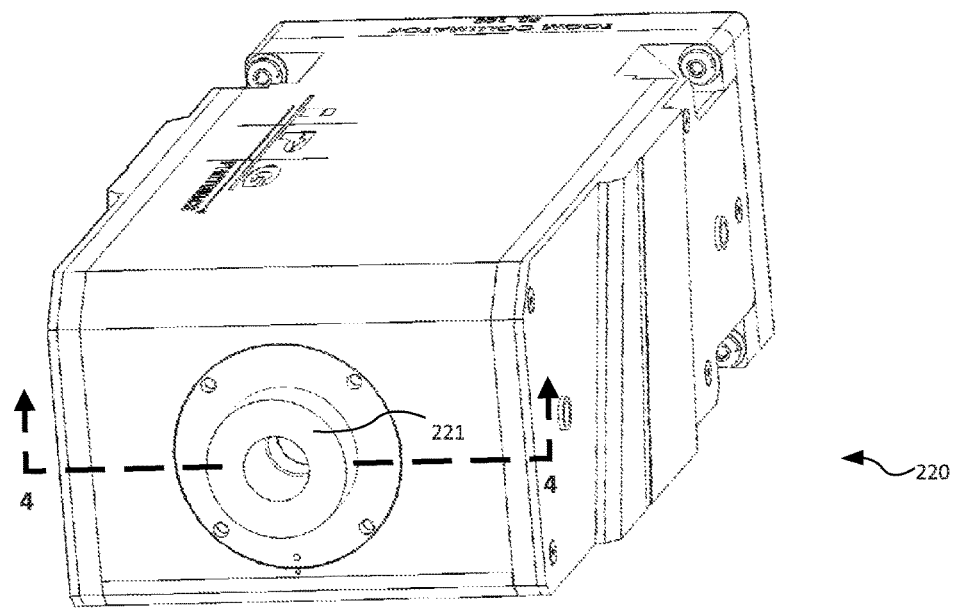
Figure 4:
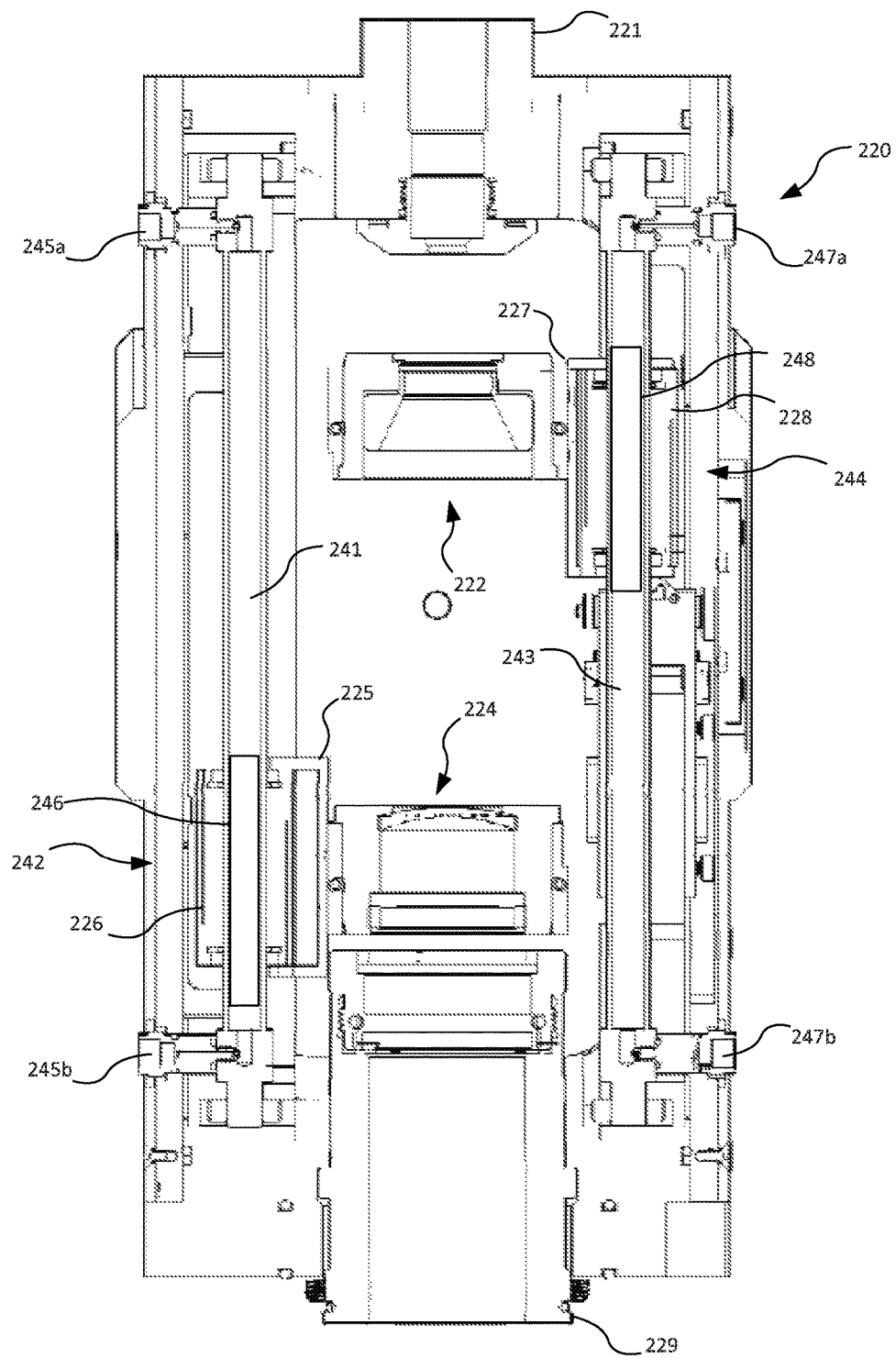
FIG. 4 is a cross-sectional view of the controllable collimator module taken along line 4-4 in FIG. 3.
Figure 6:
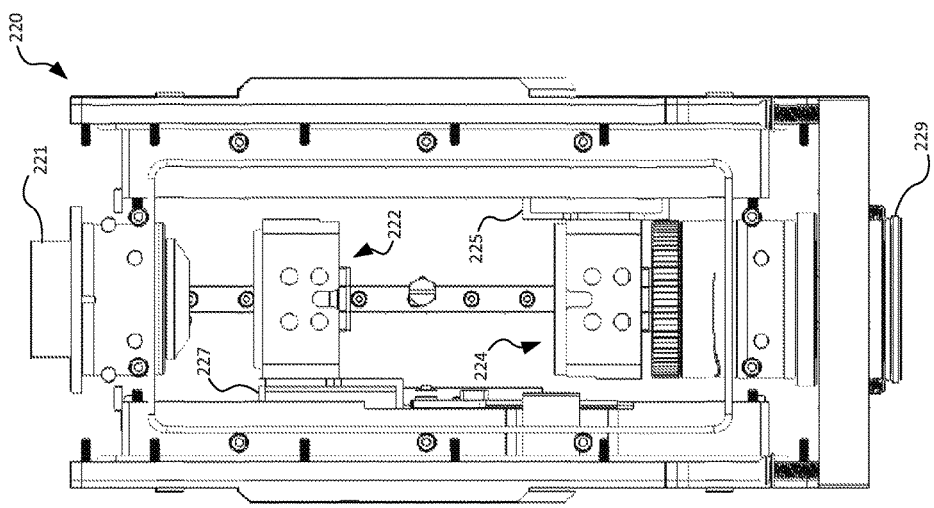
FIGS. 5 and 6 are front and back side views of inside the controllable collimator module shown in FIGS. 2 and 3.
Figure 5:
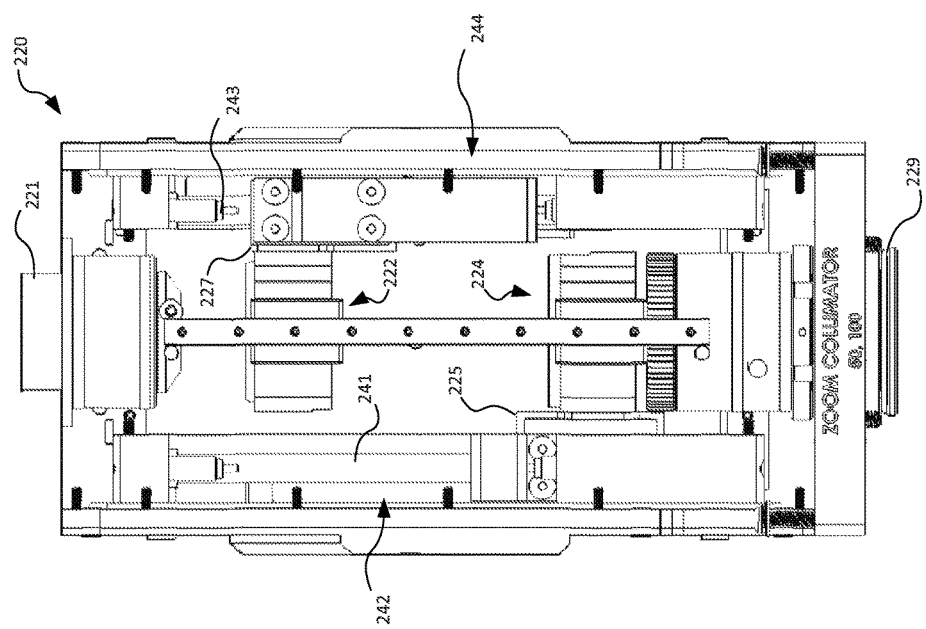
Figure 7:
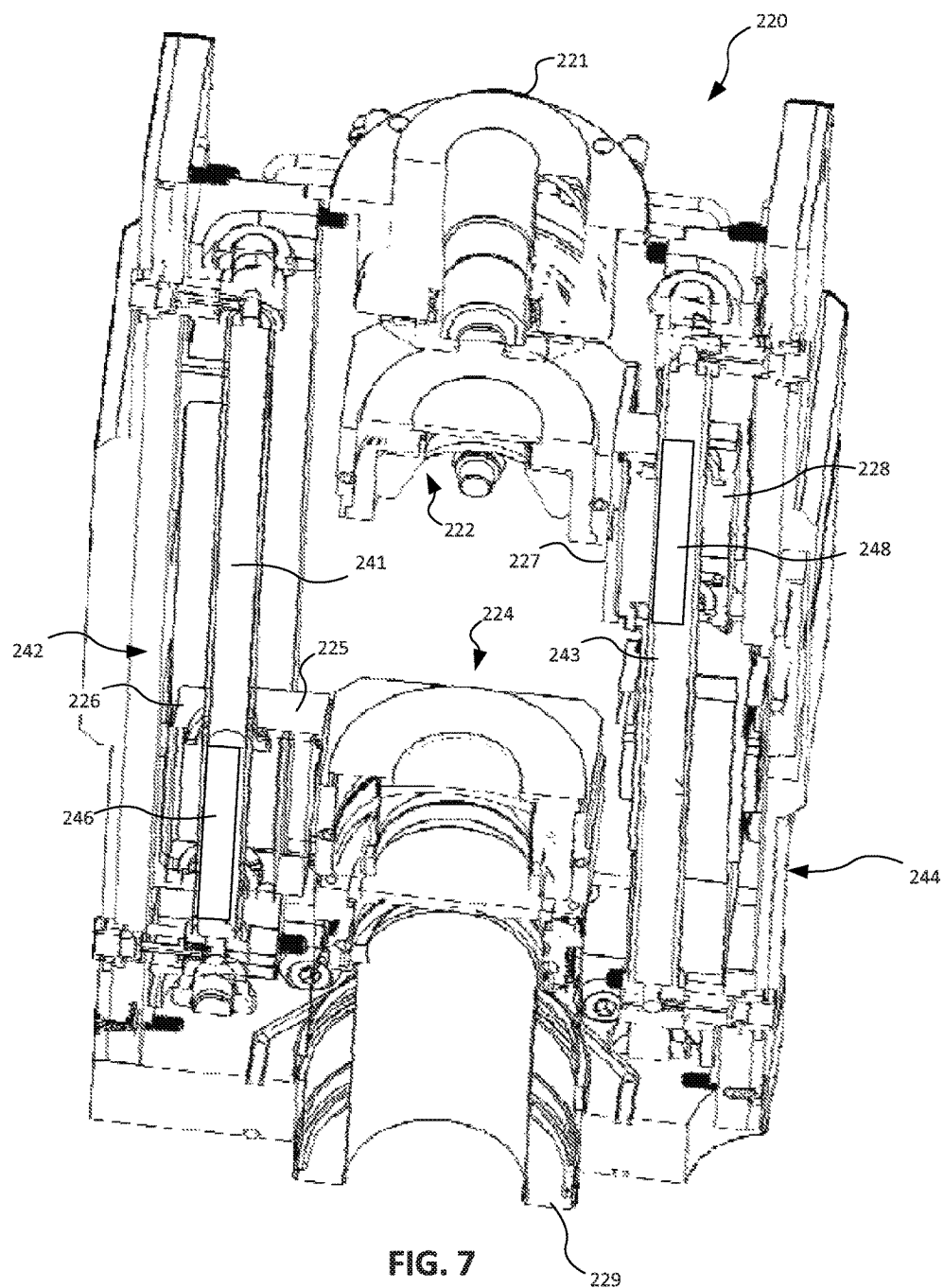
FIG. 7 is a cross-sectional perspective view of the lenses and pneumatic lens moving mechanism in the controllable collimator module shown in FIGS. 5 and 6.

Referring to FIG. 1, a laser cutting system 100 includes a laser cutting head 110 coupled to an output fiber 111 of a fiber laser 112. The laser cutting head 110 may be used to perform cutting and other laser machining or processing operations on a workpiece 102. The laser cutting head 110 and/or the workpiece 102 may be moved relative to each other along the direction of a cut 106. The laser cutting head 110 may be located on a motion stage 114 for moving the cutting head 110 relative to the workpiece 102 along at least one axis, for example, along the length of the cut 106. Additionally or alternatively, the workpiece 102 may be located on a motion stage 108 for moving the workpiece 102 relative to the laser cutting head 110.

The fiber laser 112 may include an Ytterbium fiber laser capable of generating a laser in the near infrared spectral range (e.g., 1060-1080 nm). The Ytterbium fiber laser may be a single mode or multi-mode continuous wave Ytterbum fiber laser capable of generating a laser beam with power up to 1 kW in some embodiments and higher powers up to 20 kW in other embodiments. Examples of the fiber laser 112 include the YLR SM Series or YLR HP Series lasers available from IPG Photonics Corporation.

The laser cutting head 110 generally includes a controllable collimator 120 for collimating the laser beam 116 from the output fiber 111 and a focus lens assembly 130 including at least a focus lens 132 for focusing and delivering a focused beam 118 to the workpiece 102. The controllable collimator 120 and the focus lens assembly 130 may be provided as separate modules that may be coupled together.

The controllable collimator 120 is coupled at the other end to an output fiber connector on the output fiber 111.

The controllable collimator 120 includes at least first and second movable lenses 122, 124 that can move together with a constant spacing therebetween or separately such that the spacing between the lenses changes. The collimator lenses 122, 124 may include known collimator lenses used in existing collimators used for laser cutting heads. The collimator 120 further includes a lens moving mechanism 140 coupled to both lenses 122, 122 to provide the lens movement, as will be described in greater detail below. The lens moving mechanism 140 thus allows the lenses 122, 124 to be moved precisely, controllably and quickly for purposes of changing the size of the beam diameter or beam spot and changing a location of the focal point during a laser machining operation, which enables faster laser machining.

The focus lens 132 may include focus lenses known for use in laser cutting heads and having a variety of focal lengths ranging, for example, from 125 mm to 250 mm. The focus lens 132 may also be adjustable in different axes, and in some embodiments, the focus lens assembly 130 may include a lens moving mechanism, similar to that used for the collimator lenses, to control movement of the focus lens 132. Other optical components may also be used in the laser cutting head 110. The lens assembly may also include a protective window (not shown) in front of the lens 132 to protect the lens and other optics from the debris produced by the cutting process.

The focus lens assembly 130 may further include a cutting nozzle 136 for directing the laser beam 118 together with a gas to the workpiece 102. The cutting nozzle 136 is coupled to a gas source 150 for supplying the gas to the nozzle 136. The laser cutting head 110 may thus be used in a gas-assisted laser machining process. One type of gas-assisted laser machining process uses a laser to soften the material and uses a high pressure gas (e.g., nitrogen at 300 psi) to remove the material. Another type of gas-assisted laser machining process uses the laser to burn the material in the presence of a lower pressure gas (e.g., oxygen at 1-2 psi).

The illustrated embodiment of the laser cutting system 100 further includes a control system 160 for controlling the fiber laser 112, the positioning of the collimator lenses 122, 124, and/or the motion stages 108, 114. The control system 160 may include both laser control and lens control working together to control both the laser and the lenses together. The control system 160 may control the laser, for example, by turning the laser on and off, controlling a power of the laser, and/or controlling any other controllable parameter of the laser. The control system 160 may include, for example, hardware (e.g., a general purpose computer) and software for use in controlling the fiber laser and the movable collimator lenses.

According to one method, the controllable collimator 120 may be used to change a location of the focal point during a laser machining operation. When cutting certain materials, for example, the laser cutting head 110 may be used first to perform a laser drilling operation to pierce the workpiece 102 at several locations along the cut line before performing a laser cutting operation. The laser cutting head 110 is moved away from the workpiece 102 for the drilling operation (e.g., using the motion stage 114 or the motion stage 108) and is positioned close to the workpiece 102 (e.g., about 1 mm) for the cutting operation. When the laser cutting head 110 is moved to change the spacing relative to the workpiece 102, the control system 160 causes the lens moving mechanism 140 to move the lenses 122, 124 together to change the focal point back to the workpiece 102.

According to another method, the controllable collimator 120 may be used to change a beam spot size on the workpiece 102 during a laser machining process. The beam spot size may be adjusted, for example, within a range of about 150 to 300 microns. The beam spot size may be adjusted, for example, for different types of materials or for different thicknesses of materials being machined.

The laser cutting head 110 with the controllable collimator 120 may also be used to easily and quickly change the beam spot size and/or focal point location in other laser machining or processing methods.

FIGS. 2-7 illustrate an embodiment of a controllable collimator module 220 in greater detail. The controllable collimator module 220 includes an input end 221 for connecting to an output fiber or process fiber coupled to a fiber laser (not shown) and an output end 229 for connecting to a focus lens assembly (not shown). Although one specific embodiment of the controllable collimator module is shown, other embodiments of the controllable collimator module, the laser cutting head and the systems and methods described herein are within the scope of the present disclosure.

As shown in greater detail in FIGS. 4-7, the controllable collimator 220 includes at least first and second collimator lenses 222, 224 coupled to first and second pneumatic lens moving mechanisms 242, 244. The collimator lenses 222, 224 may include lenses known for use in collimators for laser cutting.

The pneumatic lens moving mechanisms 242, 244 include pneumatic cylinders 241, 243 and pistons 246, 248 slidably received within the pneumatic cylinders and driven by pressurized gas supplied at each end of the cylinders 241, 243. The pneumatic cylinders 241, 243 include pneumatic inputs 245a, 245b, 247a, 247b for coupling to a pneumatic control system (not shown) to supply the pressurized gas to control the movement of the pistons 246, 248. The pistons 246, 248 are magnetically coupled to carriages 226, 228 that ride along an outside of the cylinders 241, 243. The collimator lenses 222, 224 are fixed to the respective carriages 226, 228, for example, using brackets 225, 227.

To move the collimator lens 222 downward, for example, a pneumatic control system would apply a pressure to the pneumatic input 247a causing the piston 248 and the magnetically coupled carriage 227 to move downward. To move the collimator lens 222 upward, for example, a pneumatic control system would apply a pressure to the pneumatic input 247b causing the piston 248 and the magnetically coupled carriage 227 to move upward. The other pneumatic lens moving mechanism 242 may be operated in the same way to move the lens 224 downward and upward.

Although pneumatic lens moving mechanisms are shown and described, the lens moving mechanisms may also be motorized instead of pneumatic. For example, the cylinders 241, 243 may include motors driving lead screws for moving the pistons 246, 248. In other examples, the lens moving mechanisms may include motors driving lead screws that move the carriages 226, 228 directly. Other mechanisms and actuators capable of providing controllable linear motion may also be used to move the collimator lenses as described above.

Accordingly, a laser cutting head with a controllable collimator, as described herein, is capable of advantageously moving the collimator lenses quickly to change the beam diameter and/or focal point location for different cutting operations.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser cutting head comprising:
a controllable collimator configured to be coupled to an output fiber of a fiber laser, the controllable collimator including at least first and second movable collimator lenses and a lens moving mechanism coupled to the lenses such that each of the lenses is movable independently; and
a focus lens configured to focus the laser beam relative to a workpiece.

2. The laser cutting head of claim 1 wherein the lens moving mechanism includes first and second pneumatic mechanisms coupled to the first and second movable lenses, respectively.

3. The laser cutting head of claim 2 wherein each of the pneumatic mechanisms includes a cylinder, a piston slidably received inside the cylinder and configured to be moved pneumatically within the cylinder, and a carriage magnetically coupled to the piston and slidably received outside the cylinder, wherein each of the collimator lenses is fixed to one of the carriages.

4. The laser cutting head of claim 3 wherein each of the cylinders includes a pneumatic input at each end.

5. The laser cutting head of claim 1 wherein the lens moving mechanism includes at least first and second cylinders, first and second pistons slidably received inside the cylinder and first and second carriages magnetically coupled to the first and second pistons, respectively, wherein each of the collimator lenses is fixed to one of the carriages.

6. The laser cutting head of claim 1 further comprising a cutting nozzle for directing the laser and gas to the workpiece to be cut.

7. The laser cutting head of claim 1 wherein moving the collimator lenses relative to each other changes a beam diameter and thus beam spot on the workpiece.

8. The laser cutting head of claim 1 wherein moving the collimator lenses together changes a focal point location.

9. The laser cutting head of claim 1 wherein the collimator is included in a collimator module, wherein the lens is included in a lens module, and wherein the lens module is coupled to the collimator module.

10. A controllable collimator module comprising:
an input end configured to be coupled to a fiber coupled to a fiber laser;
an output end configured to be coupled to a focus lens assembly;
at least first and second movable collimator lenses; and
a pneumatic lens moving mechanism coupled to the lenses such that each of the lenses is movable independently.

11. The controllable collimator module of claim 10 wherein the pneumatic lens moving mechanism includes at least first and second cylinders, first and second pistons slidably received inside the first and second cylinders, respectively, and first and second carriages magnetically coupled to the first and second pistons, respectively, wherein each of the collimator lenses is fixed to one of the carriages.

12. A laser cutting system comprising:
a fiber laser including an output fiber;
a laser cutting head coupled to the output fiber of the fiber laser, the laser cutting head comprising:
a controllable collimator including at least first and second movable collimator lenses and a lens moving mechanism coupled to the lenses such that each of the lenses is movable independently; and
a focus lens configured to focus the laser beam relative to a workpiece; and
a control system for controlling at least the fiber laser and positions of the collimator lenses.

13. The laser cutting system of claim 12 wherein the fiber laser includes an Ytterbium fiber laser.

14. The laser cutting system of claim 12 wherein the lens moving mechanism includes first and second pneumatic mechanisms coupled to the first and second movable lenses, respectively.

15. The laser cutting system of claim 14 wherein each of the pneumatic mechanisms includes a cylinder, a piston slidably received inside the cylinder, and a carriage magnetically coupled to the piston and slidably received outside the cylinder, wherein each of the collimator lenses is fixed to one of the carriages.

16. The laser cutting system of claim 12 wherein the laser cutting head further includes a cutting nozzle for directing the laser and gas to the workpiece to be cut.

17. The laser cutting system of claim 12 wherein the control system is configured to move the collimator lenses relative to each other changes a beam diameter and thus beam spot on the workpiece.

18. The laser cutting system of claim 12 wherein the control system is configured to move the collimator lenses together changes a focal point location.

19. A laser cutting method comprising:
providing a laser cutting head including at least first and second movable collimator lenses, a lens moving mechanism for moving the collimating lenses, and a focus lens;
generating a raw laser beam from a fiber laser;
collimating the raw laser beam by passing the beam through the first and second movable collimating lenses;
focusing the beam by passing the beam through the focus lens toward the workpiece; and
moving the collimating lenses with the lens moving mechanism to change at least one of a beam spot size and a focal point location.

20. The laser cutting method of claim 9 wherein moving the collimating lenses with the lens moving mechanism includes moving the lenses to adjust the focal plane back to the workpiece after moving the laser cutting head away from the workpiece and after moving the laser cutting head closer to the workpiece to perform different laser processing operations with the laser cutting head at different distances from the workpiece.

21. The laser cutting method of claim 20 further comprising performing a laser drilling operation to pierce the workpiece with the laser cutting head moved away from the workpiece.

22. The laser cutting method of claim 21 further comprising performing a laser cutting operation to cut the workpiece with the laser cutting head moved closer to the workpiece.

23. The laser cutting method of claim 19 wherein moving the collimating lenses with the lens moving mechanism includes moving the lenses to adjust the spot size for different thicknesses of material being cut and/or for different materials being cut.

24. The laser cutting method of claim 23 wherein the spot size is adjustable within a range of about 150 to 300 microns.

* * * * *